Dec. 6, 1932. E. P. SHAW 1,890,132
PORCELAIN ROOT TOOTH
Original Filed Aug. 3, 1922
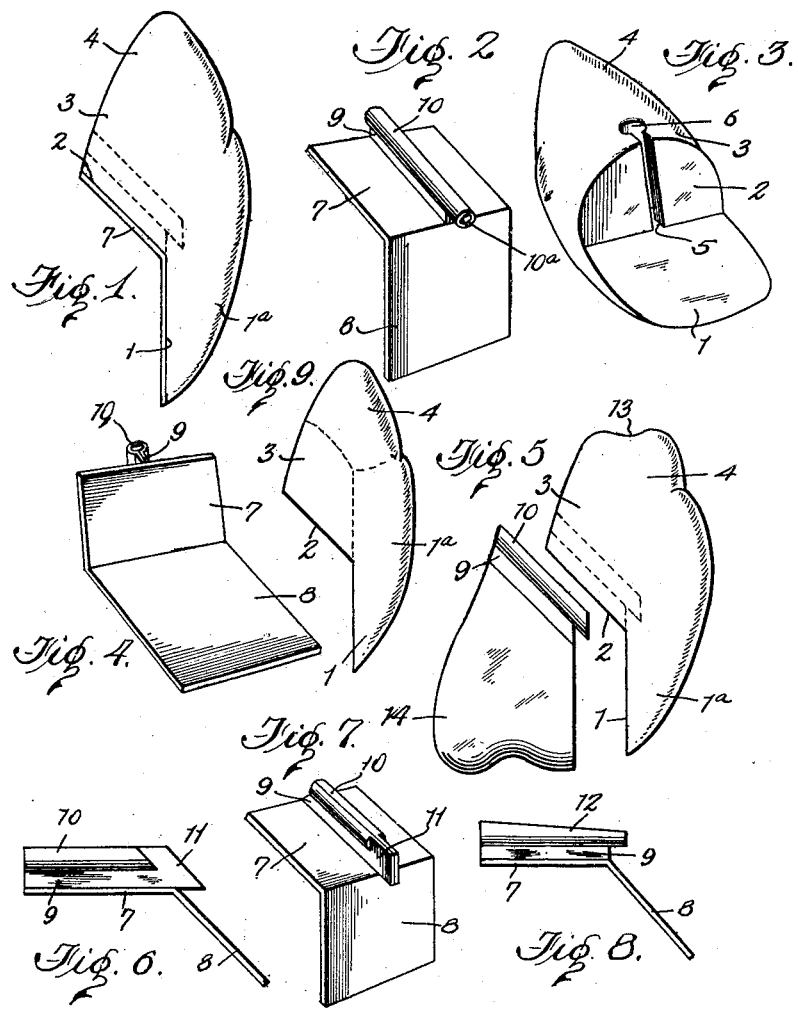

Patented Dec. 6, 1932

1,890,132

UNITED STATES PATENT OFFICE

ERNEST P. SHAW, OF SAN ANTONIO, TEXAS, ASSIGNOR TO THE COLUMBUS DENTAL MANUFACTURING COMPANY, OF COLUMBUS, OHIO, A CORPORATION OF OHIO

PORCELAIN ROOT TOOTH

Continuation of application Serial No. 579,381, filed August 3, 1922. This application filed June 7, 1927. Serial No. 197,126.

Porcelain root work has attracted more attention than any recent development in prosthetic dentistry. This is called porcelain root, or cone work because the dummies are constructed by tapering the tooth from the gingival third toward the gum; each dummy being made to reproduce the tooth form normal to each individual mouth. This gives the effect and appearance of a natural root which comes in contact with the soft tissue.

These porcelain roots must be highly glazed and when placed in the sockets of recent extraction, or in surgically prepared sockets, or to rest against the gum, they are accepted by a steadily increasing number of dentists as the only practical and æsthetic method for fixed bridgework.

The non-irritating quality of porcelain has long been recognized in the field of dentistry. The mucous membrane of the mouth takes very kindly to porcelain, and, although a foreign body generally produces an irritation, I find the minimum amount of irritation present with porcelain. This important characteristic makes artificial root insertion possible.

One problem which has confronted me is to prevent the excessive absorption following the extraction of an anterior tooth. This absorption is very objectionable for two reasons:

First, when a bridge is constructed to supply the missing tooth, the dummy facing must be placed higher than the crown of the original tooth to compensate for the absorption. This breaks the uniformity of the gingival lines.

Secondly, there is always a pocket or depression produced on the lingual of the dummy facing, where food will collect in spite of all precautions to the contrary. If this absorption is counteracted, I will have produced a piece of work which is pleasing to the eye and sanitary in construction. If this is done by the porcelain root insertion, the results produced will be pleasing both to the operator and patient. Practically all of the absorption is prevented, and, as there is nothing but porcelain in contact with the tissues in the bridged space, the irritation is reduced to the least possible amount and the patient is given a greater chance for the maintenance of a clean and healthy mouth.

What is known to the dental profession as pin facing technic has many disadvantages among which may be noted that the pin tooth has no standard porcelain certainties on which to construct metal attachments due to the shrinkage and warpage of the porcelain during the baking process. Again during the baking shift, the pins change their relative positions in the tooth, and for these reasons, the pin tooth is very hard to replace even when the facing is used without the root portion.

To repair pin facing cases, the dentist usually finds it necessary to remove the bridge from the mouth, and replace the dummy or "supply" with a new structure. Different methods of repair have been advanced, but none have fully filled the requirements of the profession, and usually the conscientious dentist removes the bridge to make the repair.

When the pin facing is employed in the anterior region, the pins often extend through the lingual cast gold restoration. When the facing is cemented to place, and the pins cut flush with the cast gold surface, there is a decided tendency for the cement to wash out and allow the facing to become loosened. Loosening of the teeth is encouraged by food striking the end of the pins during the act of incising. If the pins are cut short enough to permit the gold to completely cover the ends of the pins, they are often too short to support and anchor the facing.

Among the primary advantages of my invention may be mentioned the following:

By means of my invention the facing may have all of the surfaces that come in contact with the metal backing readily ground to standards of dimension.

Generically the object of my invention is to provide an interchangeable artificial porcelain root tooth, and a backing therefor, said tooth and backing to function as a "dummy" or "supply". The porcelain root to be inserted in the tooth socket (alveolus) where a natural tooth has been recently extracted, or to be placed in contact with the edentulous portion of the ridge, the soft tissues and mucous membrane having closed and healed over the tooth socket.

Hitherto the dentist has been obliged to add porcelain to other types of artificial teeth as sold by the manufacturer to produce a porcelain root tooth. The dentist found it necessary to have an expensive equipment, together with extraordinary skill to manipulate the porcelain from its finely ground state until its final bake or glaze upon the artificial tooth. It was necessary to have the patient present throughout the whole baking process or take with difficulty a large number of accurate impressions, either of which consumed much time. In the event that breakage occurred, it was necessary to remove the bridge from the mouth and construct and substitute a new "dummy" for the broken member.

These disadvantages are overcome with the artificial porcelain root tooth and metal backing therefor, the latter having a post and rib.

Further, the dentist can grind the artificial procelain root to the required dimensions and contour then by adding a thin veneer of lower fusing porcelain to the ground root and glazing he can procure ideal results hastily and accurately. In the event the dentist does not own the necessary equipment for baking on the veneer he can send the tooth to the laboratory and have the work done for him with equally good results.

A further object of my invention is to reduce the amount of time needed either for the dentist or the patient and also reduce the number of impressions.

A further object of my invention is to provide a porcelain tooth in which the surfaces of the tooth that come in contact with the backing are ground to a standard of dimension allowing for interchangeability and replaceability in the event of breakage.

In the drawing:

Figure 1 is a side elevation of a porcelain root tooth, with backing attached thereto, embodying my invention.

Figure 2 is a perspective view of a backing embodying my invention, detached from the tooth.

Figure 3 is a rear or lingual perspective view of my improved tooth looking from the incisal edge to the base of the tooth.

Figure 4 is a similar view of the backing, detached from the tooth.

Figure 5 is a side elevation of a bicuspid application and backing with a gold cast to the backing.

Figure 6 is a side elevation of my improved backing having a slightly modified post end.

Figure 7 is a perspective view of Figure 6, and

Figure 8 is a perspective view of my improved backing with a still further modified post.

Figure 9 is a side elevation of the tooth divided by dotted lines into the root portion 4, the lingual portion 3 and the labial or facing portion 1a.

It will be understood that my invention is applicable to both anterior and posterior teeth.

As will be seen from the drawing, my improved tooth has two flat planes designated by the reference numerals 1 and 2, which intersect preferably in an obtuse angle. The plane 1 is a flat plane formed on the labial or facing portion 1a of the tooth and extending the full width of the tooth in one dimension, and from the incisal edge of the tooth to its inter-section with the root plane or gingival plane or base 2. The gingival plane 2 is a flat plane extending the full width of the tooth in one dimension, and from its intersection with the plane 1 to and intersecting with the curved lingual surface of the lingual portion 3 of the porcelain root 4, whereby substantially the lingual half of the root 4 constitutes an overhanging portion at the base of the tooth as perhaps more fully illustrated in Figures 1 and 5; the plane 2 being directed upwardly lingually and as shown in these two figures. This gingival base plane 2 is provided with a slot 5 extending throughout the length of the plane and opening to said plane a post hole 6, which post hole is parallel to the face of the gingival plane 2 as clearly shown in Figure 1 in dotted lines, is extended at its inner end labially beyond the face of the plane 1.

The labial or buccal boundary or wall of the slot is preferably in the plane and continuous of the plane 1, as shown in the drawing, the slot 5 communicates throughout its entire longitudinal dimension gingivally with the post hole 6.

The post hole 6 is preferably cylindrically shaped and of one diameter and extends from the lingual surface of the root 4 buccally or labially and downwardly, being parallel, as above stated, with the gingival or root base 2, to a point within the structure of the tooth which point is buccal or labial to the plane 1 as clearly shown in the drawing.

The backing shown in the several figures of the drawing presents a flat attachment portion 7 which engages with the tooth and is complemental to and is engaged with the gingival or root plane 2, said portion being provided with a downwardly extending wing 8 disposed at an obtuse angle to the portion 7 and complemental with the surface 1 of the tooth when the backing and tooth are engaged.

Extending gingivally from the attaching portion 7 is a rib 9 surmounted by a post 10, the post being of a greater diameter than the rib 9, said post being parallel with the attaching portion 7 of the backing and extending longitudinally of the portion 7. This post extends labially or buccally as at 10a beyond the wing 8, and is complemental with the post opening 6, in the tooth, the rib 9 being complemental with the slot 5 of the tooth. This post and rib may be secured in any desired manner to the backing.

As shown in Figures 6 and 7, the post at its labial or buccal end may be flattened as at 11. Again, the post may be tapered as shown in Figure 8, the post in this figure being designated by the reference numeral 12, the greatest diameter of the tapered post 12 being at its lingual end. In Figure 5, I have shown my improved porcelain root tooth provided with a saddle 13 at its gingival end, which saddle is designed to rest on or against the soft tissue of the ridge. While this saddle is shown in connection with a bicuspid, it will be understood that the saddle effect may be formed in any of the teeth.

I have shown associated with the bicuspid in Figure 5, the cast gold 14, which provides a masticating surface of gold, this cast being secured in the well known manner to the backing shown in the drawing, and heretofore described, the rib 9 and post 10 only showing in this figure.

From the above it will be seen from a broad aspect that my invention provides an artificial tooth comprising the porcelain root body portion and an overhang portion, said overhang portion extending rearwardly or lingually from the facing or body portion, and which overhang portion is provided in its under face with an under cut recess extending gingivally, and further my invention is provided with a backing complemental with the tooth of this structure.

The words "labial" and "facing" are used in the specification and claim as synonyms.

A preferred method of making the artificial tooth hereinbefore described consists in assembling separate lingual labial and root portions and uniting them into an integral structure. A part which, in the finished tooth will be the lingual portion 3, may be placed on a backing such as shown in Figs. 2 or 6. With this part thus positioned, the grinding or cutting of a plane surface as a parallel continuation of the plane surface 8 may be effected with the greatest ease and precision. The plane surface thus cut or ground is indicated in the finished tooth shown in Fig. 9 by the vertical dotted line. This surface is placed in contact with the flat side of the labial portion 1a, and the obtuse angle formed by the surfaces 1 and 2 is thus, in accordance with the grinding of the lingual portion, made in advance to agree with the angularity of the wings 7 and 8. Prior to the assembling of the two portions, a notch may be cut in the sides of the lingual portion adjacent the plane surface formed as above indicated. Then when the two parts are assembled and held in place (for instance by means of wax applied at the place where, in the finished structure shown in Fig. 9 the root portion is indicated), the notches are filled with a mix of porcelain, and the assembly is baked. The baking results in firmly attaching the two portions to each other, the mix of porcelain having fused and having become practically integral with the portions 1a and 3. The wax having been melted away during the baking, a mix of porcelain is applied at the top of the two portions thus united, being shaped as desired and the tooth being again baked. The assembly is then ground to shape and glazed. If desired, the root portion 4 may be built up only to a height as shown in Fig. 5 and then baked. If afterwards, a conical root is desired, a second mix of porcelain may be applied to the saddle 13 and the application baked.

This application is filed as a continuation of the application of Shaw and Robinson, filed August 3, 1922, Serial No. 579,381.

What I claim is:

A plate type backing for an artificial pontic tooth, said tooth having a root extension and having in its occlusally directed end surface an undercut socket comprising a slot terminating away from said surface in a broadened recess, said backing consisting of a top designed to engage the base of the root extension, a depending front intersecting said top in an angle and adapted to engage the lingual face of the tooth, a tenon extending longitudinally of and upward from said top, and at one end extending labially beyond the labial edge of said top, and adapted to engage said socket.

In testimony whereof I affix my signature.

ERNEST P. SHAW.